Nov. 1, 1927.

O. C. SCHMIDT

STUFFING MACHINE

Filed Sept. 16, 1927

INVENTOR.

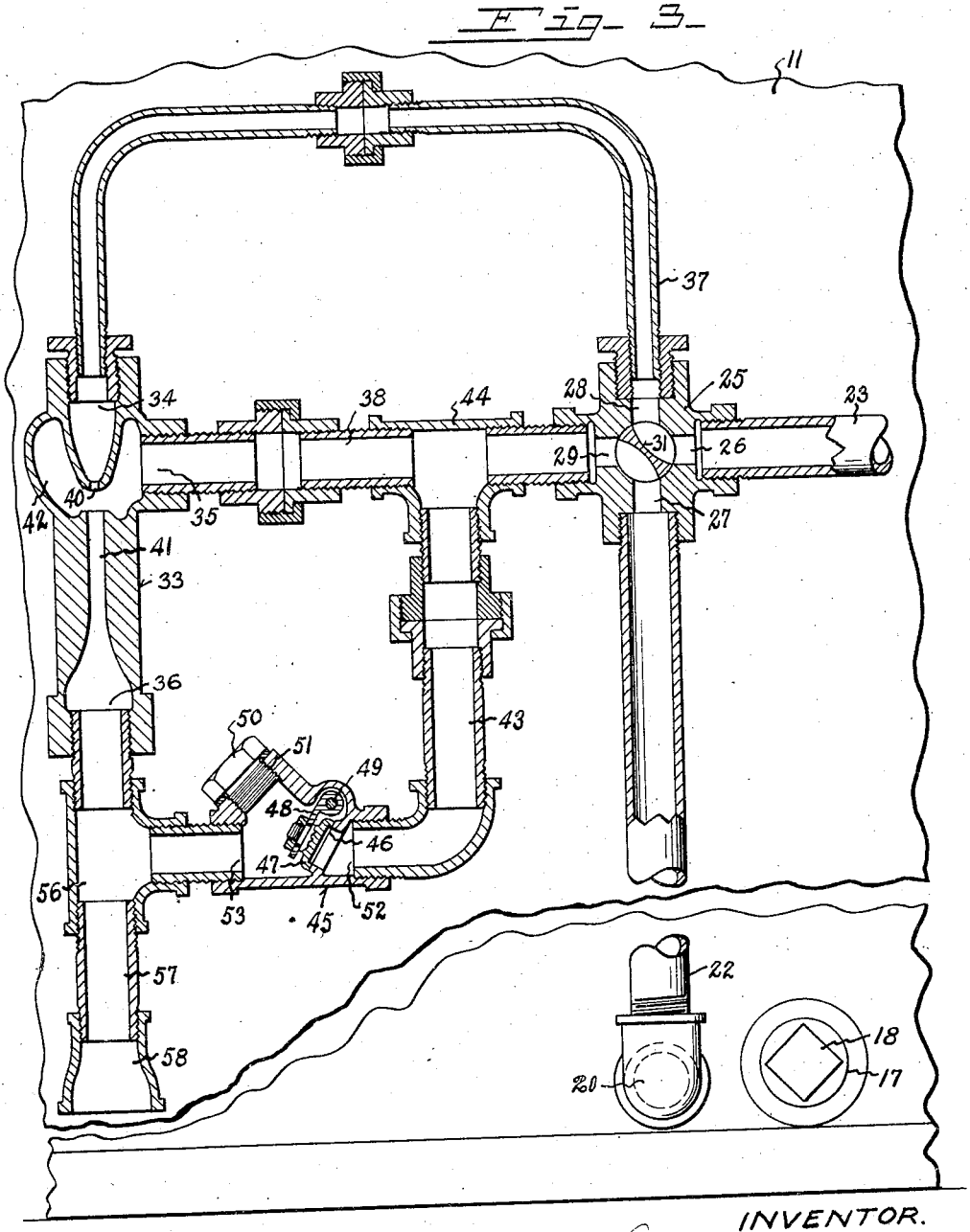

Patented Nov. 1, 1927.

1,647,752

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

STUFFING MACHINE.

Application filed September 16, 1927. Serial No. 219,943.

My invention relates to stuffing machines applicable among other things for stuffing sausage casings, and embraces a casing in which there is a press-head which is moved in one direction for feeding the material at one side of the press-head out of the casing by means of pressure applied at the other side of the press-head, which pressure is exerted by fluid under pressure such as compressed air or water, the return movement of the press-head being caused by relief of such pressure and by gravity movement of the press-head due to its weight.

In mechanism of this character as heretofore usually constructed, the return movement of the press-head has been comparatively slow as the weight of the press-head was depended upon to discharge the fluid under the press-head, this weight movement being often otherwise retarded by friction between the press-head and the inner face of the casing.

It is the object of my invention to overcome the slowness of return movement of the press-head; further, to provide novel means whereby quick discharge of the fluid under the press-head is obtained; and, further, to provide novel means whereby suction is caused under the press-head to rapidly return the press-head to initial position.

It is the object of my invention further to provide novel means whereby to employ the fluid under pressure for rapidly returning the press-head to initial position; and, further, to provide novel means operated by fluid under pressure and controlled by a single operating handle for supplying the fluid in the casing under the press-head for operative movement of the press-head and for withdrawing the fluid under the press-head for quick return of the press-head to initial position.

The invention will be further readily understood from the following description and claims, and from the drawings, in which latter:

Fig. 3 is a vertical axial section showing the fluid manipulating devices and the connections therebetween, taken on the line 3—3 of Fig. 2.

Figure 1:
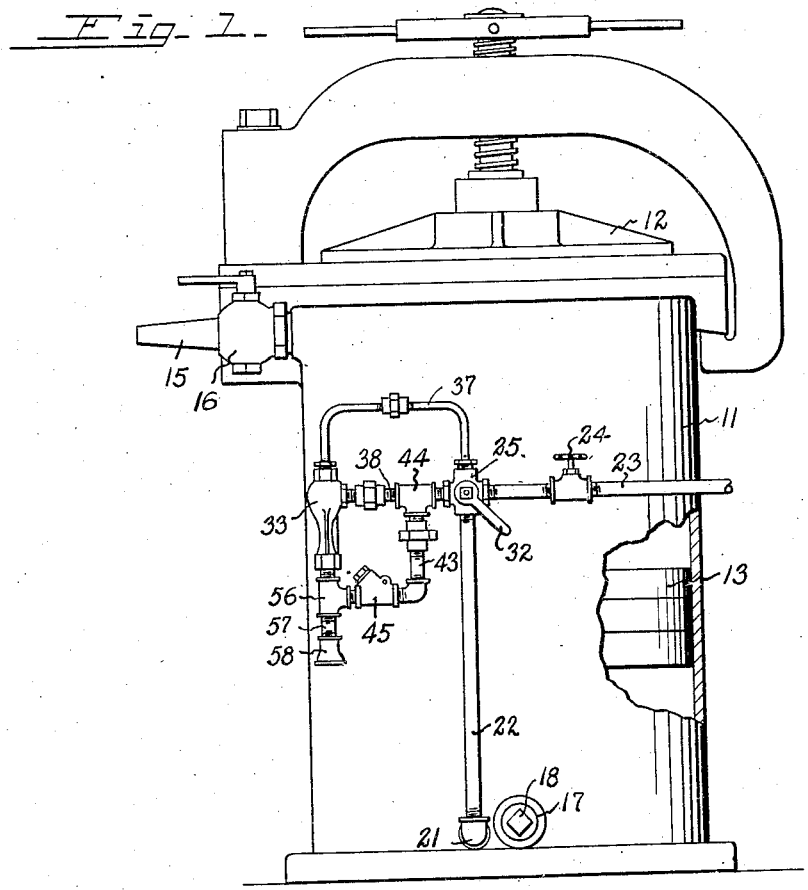
Fig. 1 is a side elevation of a stuffing machine embodying my invention, partly broken away.
Figure 2:
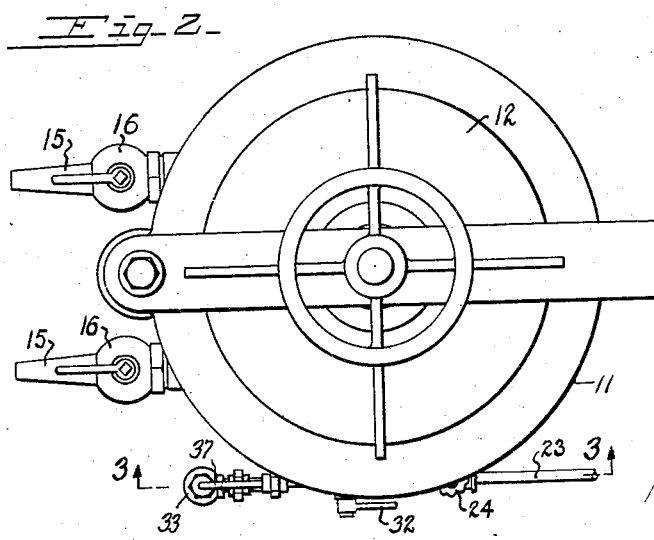
Fig. 2 is a plan view of the same.

The stuffing machine may be of any usual construction and the exemplification thereof comprises a casing 11, a cover 12 and a press-head 13, which is reciprocable up and down in the casing. The cover is arranged to be opened and closed in any usual manner, the cover when closed being clamped in place by suitable mechanism so as to resist the pressure of the material and prevent leakage thereof through the top of the casing. This material, which may be meat dough, for use in filling sausage casings, is placed in the casing above the press-head whilst the press-head is in retracted position in the bottom of the casing. The material is arranged to be pressed by the press-head, the material being forced through suitable orifices or nozzles, the nozzles being shown at 15, between which and the upper part of the casing suitable valves 16 are interposed for controlling the flow of plastic material from the stuffing machine. A suitable cleaning port 17 may be provided at the lower end of the casing, normally closed by a plug 18.

Fluid under pressure is let into the casing under the press-head, as through a port 21, a pipe 22 being shown connected with said port. The fluid under pressure may be received from a suitable source of supply through a pipe 23, in which there is a valve 24 for regulating and shutting off the supply of fluid under pressure.

A valve 25 comprises an infeed port 26 for the fluid under pressure, a port 27 communicating with the passage or pipe 22, a pressure exit port 28 and a relief port 29, the valve stem 31 being arranged to cause communication respectively between the ports 26 and 27 and the ports 28 and 29, or between the ports 26 and 28 and between the ports 27 and 29. The valve-stem has an operating handle 32 fixed thereto for controlling the direction of flow of the fluid under pressure.

A siphon 33 comprises a pressure port 34, a relief port 35 and a discharge port 36. A pipe 37 connects the pressure exit port 28 of the valve 25 with the pressure port 34 of the siphon 33. Fluid under pressure is caused to pass through this passage or pipe and through the siphon when the pressure infeed port 26 and the pressure exit port 28 of the valve 25 are in communication.

A pipe 38 communicates with the interior of the casing 11 under the press-head 12, this communication, in the present exemplification, being part-way through the pipe 22 and the port 21 in the lower end of the casing. This passage or pipe connects with the relief exit port 29 of the valve 25 and with the relief port 35 of the siphon 33.

The siphon may be of desirable construction and is exemplified as comprising a nozzle 40 for the fluid under pressure, which discharges into a passage 41, which is of greater diameter than the outlet of the nozzle 40. The nozzle discharges through a chamber 42 in the siphon for drawing fluid from said chamber with the pressure discharge through the nozzle into the passage 41. The chamber 42 communicates with the pipe 38, and when the valve 25 is set so as to connect the relief port 27 with the port 29, fluid is drawn from within the casing under the press-head through the port 21 and the pipe 22. During such relation of the valve 25 the infeed port 26 of said valve is connected with the pressure exit port 28 of said valve, whereby fluid under pressure is caused to pass through the pipe 37 and through the nozzle 40.

A pipe 43 communicates with the interior of the casing under the press-head, this communication, in the present exemplification being partway through a portion of the pipe 38 and the pipe 22. The pipe 43 is shown connected with the pipe 38, as by means of a T-coupling 44. The pipe 43 includes a check-valve 45. This check-valve may be of usual or suitable construction and is exemplified as comprising a valve-seat 46, upon which a flap-valve-part 47 is arranged to be seated, this valve-part being fixed to an arm 48 pivoted on a pivot 49 in the body of the check-valve. A plug 50 is threaded into an opening 51 in the check-valve. The check-valve comprises an inlet port 52 and a discharge port 53.

The discharge port 53 of the check-valve preferably communicates with the discharge port of the siphon, as by means of a T-coupling 56, connected with said respective discharge ports. A pipe 57 connects with the T-coupling and is provided with a discharge bell 58, into which the discharge from the siphon and from the check-valve are received.

The passages or piping may include suitable lengths of piping suitably bent, suitable compression bushings, angles, tees and unions, for providing the desired assembly.

While I have shown a compact assembly of the parts, it is obvious that changes in such assembly may be made, and communications between the valve mechanism, the siphon and the check-valve and the pressure end of the casing provided other than that specifically shown without departing from the spirit of my invention as disclosed in the appended claims.

Exemplifying the operation of the present exemplification, when the press-head is to be moved in pressing direction for pressing upon the body of material in the casing at one side of the press-head, the valve 25 is set so as to cause communication between the infeed port 26 and the port 27. Fluid under pressure from the source of pressure supply is thereby caused to flow through the pipe 22 and through the port 21 at the lower end of the casing 11, whereby the press-head is caused to move upwardly, causing pressure against the body of material above the press-head, and causing the material to flow through the nozzles 15.

When the material has been expelled, and it is desired to lower the press-head, the setting of the valve 25 is changed so as to cause communication between the port 27 and the relief port 29 and to cause communication between the infeed port 26 and the pressure exit port 28, as exemplified in Fig. 3.

Assuming that compressed air or other compressible fluid is employed as the moving medium for the press-head, the fluid is under substantially high pressure, and as soon as the last-named relation in the valve 25 is obtained, this fluid under high pressure will find relief through the port 21, the pipe 22, the valve 25, its relief port 29, the pipe 38, and the pipe 43 and the check-valve 45, the pressure of this fluid automatically opening said check-valve, the fluid under pressure passing through the discharge pipe 57.

In the meantime fluid under pressure from the source of compressed fluid passes through the pipe 37, the pressure port 34 of the siphon 33, through its nozzle 40, part of the fluid under pressure being discharged from the casing passing through the chamber 42 in the siphon and being discharged through the discharge port of the siphon and through the discharge pipe 57.

When the pressure of the fluid under pressure under the press-head has been relieved to the extent that it will no longer automatically retain the check-valve in open relation, which is the relation exemplified in the drawings, the balance of this fluid, which is under less pressure, will be caused to pass through the passage or pipe 38 through the chamber 42 of the siphon, and through the discharge port of the siphon, being drawn or sucked therethrough by the action of the fluid under pressure passing from the source of fluid under pressure through the pressure port 34 of the siphon. This pressure also acts on the check-valve 45 to maintain the same in closed position. The suction upon the interior of the casing under the press-head continues for drawing down the press-head and creating a vacuum under said press-head for the rapid return of the press-head to its initial position in the bottom of the casing.

In the present exemplification, the weight of the press-head aids in such return of the press-head to initial position. If there should be any tendency for the press-head to frictionally hold upon the inner wall of the casing the suction or vacuum created thereunder will quickly return the press-head to initial position. The pressure under the press-head is also drawn off or removed very quickly by my improved device, so as to remove all sustaining pressure from the press-head and substituting therefor a suction or vacuum for quick return of the press-head.

My improved device is simple in construction, compact in arrangement, economical in structure and operation, and insures increased capacity and more rapid movement in the stuffing machine.

Having thus fully described my invention, what I claim as new, and desire to secure by Letters Patent, is:

1. In a stuffing machine of the character described, the combination of a casing, a press-head reciprocable therein, a passage communicating with said casing under said press-head for feeding fluid under pressure into said casing under said press-head, a passage communicating with said casing under said press-head for receiving discharge of fluid from said casing under said press-head, a siphon in said last-named passage, said first-named passage and said siphon arranged for receiving fluid under pressure, and valve mechanism controlling the supplies of said fluid under pressure respectively to said first-named passage and to said siphon.

2. In a stuffing machine of the character described, the combination of a casing, a press-head reciprocable therein, a passage communicating with said casing under said press-head for feeding fluid under pressure into said casing under said press-head, a passage communicating with said casing under said press-head for receiving discharge of fluid from said casing under said press-head, a siphon in said last-named passage, a passage communicating with said casing under said press-head for receiving discharge of fluid from said casing under said press-head, a check-valve in said last-named passage opening by pressure in said casing under said press-head, said first-named passage and said siphon arranged for receiving fluid under pressure, and valve mechanism controlling the supplies of said fluid under pressure respectively to said first-named passage and to said siphon and controlling the withdrawal of fluid under said press-head through said siphon and through said check-valve.

3. In a stuffing machine of the character described, the combination of a casing, a press-head reciprocable therein, a passage communicating with said casing under said press-head for feeding fluid under pressure into said casing under said press-head, a passage communicating with said casing under said press-head for receiving discharge of fluid from said casing under said press-head, a siphon in said last-named passage, a passage communicating with said casing under said press-head for receiving discharge of fluid from said casing under said press-head, a check-valve in said last-named passage, said check-valve communicating with said siphon and arranged for open relation of said check-valve during greater pressure of fluid in said casing under said press-head and for closed relation of said check-valve with relation to said siphon during less pressure of fluid in said casing under said press-head, and valve mechanism controlling the supplies of said fluid under pressure respectively to said first-named passage and to said siphon.

4. In a stuffing machine of the character described, the combination of a casing, a press-head reciprocable therein, a passage communicating with said casing under said press-head for feeding fluid under pressure into the said casing under said press-head and for relief of fluid in said casing under said press-head, a valve in said passage controlling said feeding and relief of said fluid and comprising a pressure inlet port, a pressure outlet port and a relief port, and a siphon comprising a pressure port, a relief port and a discharge port, said pressure outlet port of said valve communicating with said pressure port of said siphon, and said relief port of said valve communicating with said relief port of said siphon.

5. In a stuffing machine of the character described, the combination of a casing, a press-head reciprocable therein, a passage communicating with said casing under said press-head for feeding fluid under pressure into the said casing under said press-head and for relief of fluid in said casing under said press-head, a valve in said passage controlling said feeding and relief of said fluid and comprising a pressure inlet port, a pressure outlet port and a relief port, a siphon comprising a pressure port, a relief port and a discharge port, said pressure outlet port of said valve communicating with said pressure port of said siphon, a relief passage between said relief port of said valve and said relief port of said siphon, and a check-valve, said check-valve communicating with said relief passage and arranged to open upon greater pressure in said relief passage and to close upon less pressure in said relief passage for closing said check-valve to said relief-port of said siphon.

6. In a stuffing machine of the character described, the combination of a casing, a press-head reciprocable therein, a passage communicating with said casing under said press-head for feeding fluid under pressure into said casing under said press-head and for relief of fluid in said casing under said press-head, valve mechanism comprising an infeed port for fluid under pressure, a port communicating with said passage, a pressure exit port and a relief exit port, a siphon comprising a pressure port, a relief port and a discharge port, a passage between said last-named pressure port and said pressure exit port of said valve mechanism, a passage between said relief ports of said valve mechanism and of said siphon, a check-valve comprising an inlet port and a discharge port, a passage between said inlet-port of said check-valve and said last-named passage, said check-valve arranged for opening upon greater pressure in said last-named passage and to close upon less pressure in said last-named passage, and a discharge passage communicating with the discharge ports of said siphon and of said check-valve.

In testimony whereof, I have hereunto signed my name.

OSCAR C. SCHMIDT.